Patented Mar. 6, 1945

2,370,960

UNITED STATES PATENT OFFICE 2,370,960

BATH FOR HEATING SOLDERING IRONS

Artemas F. Holden, Northford, Conn.

No Drawing. Application May 9, 1942,
Serial No. 442,306

2 Claims. (Cl. 148—13.2)

The present invention relates broadly to metallurgy and more especially to a salt bath for heating soldering irons to relatively low temperatures.

Soldering irons are usually made of copper having a pyramid shaped end which is covered with tin. In the use of the soldering iron, it must be heated and the common method of heating is by the use of a forge or torch. The soldering iron is heated in atmosphere in both the well known ways of heating, either by torch or by forge, and the outer surfaces become covered with copper oxide. This oxide gradually encroaches upon the area which has been tinned. The copper oxide surfaces of the soldering iron head are not useful in soldering operations so that it is desirable that the working surfaces of the head of the iron shall be covered with tin. As previously explained, the tinned areas gradually decrease in the normal heating and cooling of the soldering iron and it becomes necessary to file or sandpaper the work surfaces of the soldering head to re-tin the same in order that the soldering iron may be maintained in good working condition.

It also happens, where a soldering iron is heated in a forge or by a torch, that the iron is frequently overheated for certain classes of work. Where the melting point of the material being soldered and the solder itself differs only by a few degrees, the heat of the soldering iron becomes critical and it is extremely difficult to control the heat of the soldering iron within the required limits where a forge or torch is used as the heating apparatus.

The present invention relates to a salt bath for heating of a soldering iron between 550° F. and 750° F. and wherein the temperature may be definitely controlled. By the use of the present invention, the surfaces of the soldering iron head are maintained clear and clean from oxide and, therefore, the head does not require frequent refinishing as is necessary in the known art. Furthermore, by the use of an electrically controlled furnace or by the use of thermostat controls for the heat producing apparatus, the temperature of the salt bath may be retained definitely within a few degrees of the desired point between 550° F. and 750° F.

By the use of the present invention, greatly improved conditions are definitely maintained. The bath of the present invention is a simple one comprising alkali metal hydroxides and sodium cyanide. The bath may comprise sodium hydroxide 20% to 50%; potassium hydroxide 20% to 50%; and sodium cyanide 10% to 30%. The usual operating temperature for soft soldering operations in the low temperature range is about 700° F., and the preferred formula for use at this temperature is 20% sodium cyanide, 40% potassium hydroxide, and 40% sodium hydroxide. For the lower temperature ranges, the proportion of potassium hydroxide in the solution, may be increased. For higher temperature ranges, the proportion of sodium hydroxide in the formula may be increased. Also, in the higher temperature ranges, the sodium cyanide may be increased.

The purpose of the cyanide in the present bath is to take up any oxygen which may be present and thereby prevent oxidation of the copper head of the soldering iron by any oxygen that may be released from a break down of the hydroxide, and for that reason, an additional amount of cyanide may be desirable in the higher temperature range.

The present bath, when hot, is easily soluble in water and the bath does not add any fluxing qualities to the soldering operations. Therefore, it is desirable that traces of the bath adhering to the soldering head be removed before the use of the iron on the work. This may be accomplished by quickly dipping the iron into water or an aqueous solution. The aqueous solution may contain zinc chloride or other scavenging agents. The optional immersion of the soldering head in the water bath is of very short duration and is not sufficient to seriously cool the iron.

Retention of a small amount of the bath on the iron does not seriously interfere with its operation but does introduce a foreign element into the soldering zone and for this reason, particularly, it may be desirable, under some conditions, to eliminate such retained portions of the bath by the simple momentary quenching of the heated iron in water or an aqueous solution such as above mentioned.

The present bath may be heated in iron pots or kettles or in a kettle of any other material which is not attacked by the constituents of the bath. The heating of the bath may be by any well known heating agent such as electricity, gas, oil, or fuel, so long as the heating agent may be controlled to obtain the desired critical temperature.

What I claim is:

1. An oxidation-inhibiting immersion-heating medium for soldering irons of the type having a tinned-copper soldering surface subject to objectionable surface oxidation at temperatures around 700° F., comprising: a salt composition fusible to constitute a fluid heating bath at temperatures between 550° and 700° F., said composition consisting essentially of 20% to 50% sodium hydroxide, 20% to 50% potassium hydroxide and from 10% to 30% sodium cyanide and otherwise having such character as to be readily removable from a thus-heated tinned-copper surface by simple momentary quenching of said surface in an aqueous bath.

2. The method of conditioning a soldering iron of the type provided with a tinned-copper soldering surface, which comprises: heating and fusing a salt composition containing from 20% to 50% sodium hydroxide, 20% to 50% potassium hydroxide and from 10% to 30% sodium cyanide to a temperature in the neighborhood of 700° F., immersing said soldering iron therein until the temperature thereof has reached an elevation approximately that of said thus-heated fused composition, and then momentarily quenching said iron in an aqueous bath to remove any vestiges of said composition which may have remained thereon from said immersion therein.

ARTEMAS F. HOLDEN.